United States Patent
Okuda et al.

(10) Patent No.: US 8,462,264 B2
(45) Date of Patent: Jun. 11, 2013

(54) VIDEO SCAN CONVERTER FOR PERFORMING INTERLACED TO PROGRESSIVE SCAN CONVERSION

(75) Inventors: Tadayoshi Okuda, Osaka (JP); Toshiya Noritake, Osaka (JP)

(73) Assignee: Panasonic Corporation, Osaka (JP)

( * ) Notice: Subject to any disclaimer, the term of this patent is extended or adjusted under 35 U.S.C. 154(b) by 683 days.

(21) Appl. No.: 12/427,829

(22) Filed: Apr. 22, 2009

(65) Prior Publication Data

US 2009/0322939 A1   Dec. 31, 2009

(30) Foreign Application Priority Data

Apr. 23, 2008   (JP) .................................. 2008-112344

(51) Int. Cl.
*H04N 11/00*   (2006.01)
(52) U.S. Cl.
USPC ............................. 348/441; 348/458; 348/448
(58) Field of Classification Search
USPC ...................... 348/441, 701, 97, 458, 448, 452
See application file for complete search history.

(56) References Cited

U.S. PATENT DOCUMENTS

| | | | | |
|---|---|---|---|---|
| 4,876,596 A | * | 10/1989 | Faroudja | 348/450 |
| 6,091,776 A | * | 7/2000 | Linzer | 375/240.12 |
| 6,144,410 A | | 11/2000 | Kikuchi | |
| 6,297,848 B1 | * | 10/2001 | Westerman | 348/448 |
| 6,408,024 B1 | * | 6/2002 | Nagao et al. | 375/240.01 |
| 2002/0130970 A1 | * | 9/2002 | Jiang | 348/459 |
| 2004/0061803 A1 | | 4/2004 | Terai | |
| 2004/0212733 A1 | | 10/2004 | Tokuhara et al. | |
| 2005/0243214 A1 | * | 11/2005 | Morita et al. | 348/700 |
| 2007/0296811 A1 | | 12/2007 | Miyazaki et al. | |

FOREIGN PATENT DOCUMENTS

| | | |
|---|---|---|
| JP | 03-250881 | 11/1991 |
| JP | 09-181967 | 7/1997 |
| JP | 2002-525927 | 8/2002 |
| JP | 2002-330311 | * 11/2002 |
| JP | 2004-302045 | 10/2004 |
| JP | 2009-181967 | 8/2009 |
| WO | 00/16561 | 3/2000 |
| WO | 03/039148 | 5/2003 |

* cited by examiner

*Primary Examiner* — Victor Kostak
(74) *Attorney, Agent, or Firm* — Renner, Otto, Boisselle & Sklar, LLP

(57) ABSTRACT

A video scan converter processes a video stream including a first coding unit, which has been obtained by encoding a pair of fields N1 and N2 that has come from a first frame of film video, and a second coding unit, which has been obtained by encoding a pair of a field N3 that has also come from the first frame and a field M1 that has come from a second frame, not the first frame. The video scan converter includes: a decoder, which receives the video stream, decodes the first and second coding units, and sequentially outputs the data of the respective fields N1, N2, N3 and M1; and a scan converter, which generates a frame based on associated two of those fields that have been supplied from the decoder. In outputting a frame associated with the field N3, the scan converter generates the frame based on the fields N1 and N2 without using the data of the field N3.

10 Claims, 16 Drawing Sheets

VIDEO SCAN CONVERTER FOR PERFORMING INTERLACED TO PROGRESSIVE SCAN CONVERSION

BACKGROUND OF THE INVENTION

1. Field of the Invention

The present invention relates to a technique for performing interlaced to progressive scan conversion to convert interlaced 60 fields per second video, which has been obtained by carrying out 3-2 pull down conversion on progressive 24 frames per second video, to progressive video.

2. Description of the Related Art

Video signals in various data formats have been adopted to transmit and decode video. Examples of those video signals include an interlaced video signal in a 60 fields per second (including 59.94 fields per second) format and a progressive video signal in a 60 frames per second (including 59.94 frames per second) format. To cut down the quantity of video data to be transmitted and written, moving picture data is often compressed extensively compliant with an MPEG standard, for example.

Meanwhile, as the definitions of display monitors have been increasing year after year, scan conversion is carried out more and more often. For example, a method for converting original interlaced video to progressive video while a video signal is being decoded is known.

Hereinafter, processing of converting a movie film in a 24 frames per second (including 23.976 frames per second) scan format as a material of moving picture data will be described as an example. A broadcaster performs progressive to interlaced scan conversion to convert progressive 24 frames per second video to interlaced 60 fields per second video by 3-2 pull down conversion using a telecine converter. The interlaced 60 fields per second video thus obtained is then input to a moving picture encoder.

The "3-2 pull down conversion" for use in this scan conversion is a technique for reading the first one of two consecutive frames of a film source as two fields of a video signal and then reading the next frame as three fields of the video signal. And such a technique is currently used extensively in the art. Two of the three fields read have the same data. That is why the interlaced 60 fields per second video that has been subjected to the scan conversion includes the same fields redundantly.

A video stream that has been encoded by a moving picture encoder is broadcast and then received by a receiver, which decodes that video stream.

The receiver performs interlaced to progressive scan conversion to convert the interlaced 60 fields per second video to progressive 60 frames per second video. For example, Japanese Patent Application Laid-Open Publications Nos. 2002-330311 and 3-250881 disclose such scan conversion methods. Specifically, the receiver detects the regularity of the 3-2 pull down converted video, thereby locating an image signal interval that has been formed by the 3-2 pull down processing. As used herein, the "regularity" is that at least one out of every five fields of the 3-2 pull down converted video is the repetition of the field before the previous one. In the image signal interval thus located, the scan converter combines together the odd- and even-numbered fields of the same video frame yet to be subjected to the 3-2 pull down conversion. As a result, the interlaced 60 fields per second video can get converted into progressive 60 frames per second video.

FIG. 15 illustrates how to perform such processing for finding interlaced video to be 3-2 pull down converted video. According to this processing, a field difference between a given input signal and a signal that has been delayed by two fields from the input signal is calculated. Supposing that the field difference is zero if the pictures agree with each other and that the field difference is one if the pictures disagree with each other, the difference between the same fields is calculated zero every five field. In this manner, redundant fields can be detected and the given video signal can be determined to be a 3-2 pull down converted video signal.

FIG. 16 illustrates how to carry out processing for scan-converting the 3-2 pull down converted video to progressive video. Portion (A1) of FIG. 16 illustrates the original 24 frames per second film video, while portion (A2) of FIG. 16 illustrates the 3-2 pull down converted video. The 3-2 pull down converted video (A2) is encoded by a broadcaster, carried as a broadcasting wave, and then decoded by a receiver. As a result, the signal (B), which is interlaced 60 fields per second video, is obtained. And portion (C) illustrates progressive 60 frames per second video that has been subjected to the scan conversion.

According to the conventional method, one frame is formed by combining together an odd-numbered field b1 and an even-numbered field b2 of the interlaced 60 fields per second moving picture (B), thereby generating frames c1 and c2 of interlaced 60 fields per second moving picture (C) as shown in portions (B) and (C) of FIG. 16. In the same way, respective frames c3 and c4 of the interlaced 60 fields per second moving picture (C) are formed by an odd-numbered field b3 and an even-numbered field b4 among the fields that make up the interlaced 60 fields per second moving picture (B). And the frame c5 is generated by an odd-numbered field b5 and an even-numbered field b4. By repeatedly performing this processing, the progressive 60 frames per second moving picture (C) can be obtained. The progressive moving picture (C) will have the same pictures, which have been generated from each frame of the original 24 frames per second moving picture (A1), alternately repeated in two frames and then in three frames.

Suppose the interlaced video (A2) shown in FIG. 16 has been encoded to have a frame structure (in which each frame is a combination of two video fields). In that case, when the encoded video is decoded by the receiver, the interlaced video (B) shown in FIG. 16 is obtained.

Now take a look at the fields b5, b6, b7 and b8 of the output video (B) that has been obtained as a result of the decoding processing. The fields b5 and b6 that have been encoded and then decoded in combination come from two different frames F2 and F3 of the original film video. Likewise, the fields b7 and b8 also come from two different frames F3 and F4.

Such video has no correlation between the odd- and even-numbered fields, and therefore, will achieve lower coding efficiency during encoding. As a result, the image quality of the field video, generated by decoding those fields, will be inferior to that of the field video in which video yet to be subjected to the 3-2 pull down conversion is encoded within the same frame.

The conventional technique pays no attention to those fields with deteriorated image quality when scan conversion is performed on the 60 fields per second video that has been subjected to the 3-2 down conversion.

The 3-2 pull down conversion is carried out using every four frames of the film video as one processing unit, thus generating 10 frames (e.g., c1 through c10 shown in FIG. 16) of 60 Hz progressive video per processing unit. In that case, video quality will deteriorate in five out of those ten frames (e.g., in c5 through c9 in FIG. 16), thus leaving plenty of room for improvement.

SUMMARY OF THE INVENTION

It is therefore an object of the present invention to improve the quality of decoded video in a situation where odd- and even-numbered fields to be encoded with a frame structure have come from mutually different frames of video yet to be 3-2 pull down converted.

A video scan converter according to the present invention decodes an encoded video stream and then outputs the decoded stream with its scan method converted. The video stream includes a first coding unit, which has been obtained by encoding a pair of fields N1 and N2 that has come from a first frame of film video, and a second coding unit, which has been obtained by encoding a pair of a field N3 that has also come from the first frame and a field M1 that has come from a second frame, not the first frame. The video scan converter includes: a decoder, which receives the video stream, decodes the first and second coding units, and sequentially outputs the data of the respective fields N1, N2, N3 and M1; and a scan converter, which receives the data of the respective fields from the decoder and which generates and outputs a frame based on the data of associated two of those fields that have been supplied from the decoder. In outputting a frame associated with the data of the field N3, the scan converter generates the frame based on the data of the fields N1 and N2 without using the data of the field N3.

In outputting a frame associated with the data of the field N1 or N2, the scan converter may generate the frame based on the data of the fields N1 and N2.

The fields N1 and N3 may be top fields, and the fields N2 and M1 may be bottom fields.

The video scan converter may further include a memory that is able to store the data of two of the fields supplied from the decoder. If the first coding unit and then the second coding unit have been input to the decoder, the decoder does not have to store the data of the field N3 in the memory, in which the fields N1 and N2 are already stored, when outputting the data of the field N3.

The video scan converter may further include a detector for sensing, based on multiple fields that have been supplied from the decoder, that the video stream has been obtained by subjecting progressive video, including the first and second frames, to 3-2 pull down conversion. When the detector senses that the video stream has been obtained by subjecting the progressive video, including the first and second frames, to the 3-2 pull down conversion, the scan converter may generate the frame.

The image quality of the field N1 may be superior to that of the field N3.

The memory may retain the data of the field N1 for more than at least two field periods.

The video scan converter may further include: a first memory that is able to store the data of at least two of the fields supplied from the decoder; and a second memory that is able to store the data of the frame generated by the scan converter. When the scan converter outputs a frame associated with the data of the field N2, the first memory may retain the data of the fields N1 and N2 and the scan converter may generate a frame based on the data of the field N1 retained in the memory and the data of the field N2 supplied from the decoder and then write the data of the frame thus generated into the second memory. On the other hand, when outputting a frame associated with the data of the field N3, the scan converter does not have to generate any frame based on the data of the fields but may output the data of the frame stored in the second memory.

The video stream may be interlaced 60 fields per second video that has been obtained by subjecting 24 frames per second film video to 3-2 pull down conversion. The scan converter may output a frame of progressive 60 frames per second video.

The video stream may have an identifier indicating that the video stream has been obtained by subjecting progressive video, including the first and second frames, to 3-2 pull down conversion. The video scan converter may further include a detector for sensing, by reference to the identifier, that the video stream has been obtained by subjecting the progressive video, including the first and second frames, to the 3-2 pull down conversion. When the detector senses that the video stream has been obtained by subjecting the progressive video, including the first and second frames, to the 3-2 pull down conversion, the scan converter may generate the frame.

The video scan converter of the present invention minimizes the use of video fields in which frames of the video yet to be subjected to the 3-2 pull down conversion have been encoded differently between odd- and even-numbered fields, thereby getting scan conversion done while significantly reducing the deterioration in image quality to be caused by encoding.

DETAILED DESCRIPTION OF PREFERRED EMBODIMENTS

Hereinafter, preferred embodiments of a video scan converter according to the present invention will be described with reference to the accompanying drawings.

But before those preferred embodiments are described, an environment where the video scan converter is typically used will be described.

Figure 1:
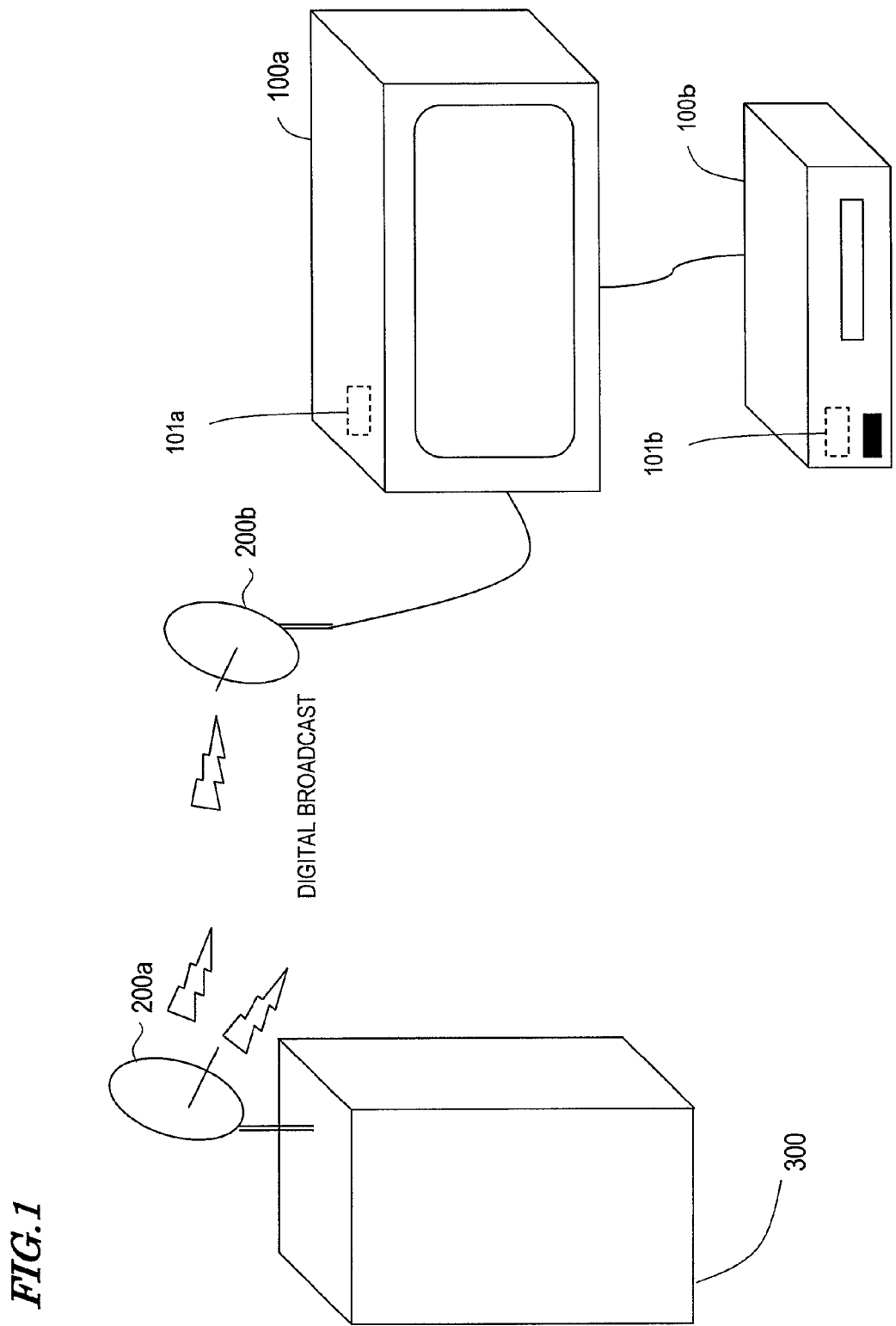
FIG. 1 illustrates an environment where a video scan converter is used.

FIG. 1 illustrates an environment where a video scan converter according to the present invention is used. For example, the TV set 100*a* includes a video scan converter 101*a*, which is implemented as a semiconductor chip.

The broadcaster 300 transmits a broadcasting wave representing a digital TV program via its antenna 200*a*. The digital TV program may be interlaced 60 fields per second video that has been obtained by subjecting 24 frames per second (including 23.976 frames per second) movie film to 3-2 pull down conversion, for example. The broadcaster 300 encodes two fields of the interlaced video using a frame structure and then transmits the broadcasting wave as an MPEG video stream, for instance.

Then the TV set 100*a* receives the broadcasting wave via its antenna 200*b*. The video scan converter 101*a* performs the processing of any of the preferred embodiments of the present invention to be described below, thereby decoding the interlaced video that has been encoded with the frame structure and getting the video presented on the TV set 100*a*.

The video scan converter of any of the preferred embodiments of the present invention to be described below may be built in any other device as long as that device has the function of decoding a digital TV program and presenting it as video. For example, a recorder 100*b* that receives, decodes and presents a digital TV program may also have a video scan converter 101*b*, which is implemented as a semiconductor chip, built in. Alternatively, although not shown, the device may also be a PC, a cellphone, a portable media player, a PDA, or a car navigation system.

Still alternatively, the video scan converter of any of the preferred embodiments of the present invention to be described below may also be built in an optical disc player that can read a video signal stored on an optical disc such as a DVD or a Blu-ray Disc or a network player that can read a video signal on the Internet, not just digital TV programs. In those cases, the video signal is acquired via an optical disc medium or the Internet, not the broadcasting wave.

Hereinafter, it will be outlined with reference to FIG. 2 how to get done the processing of transmitting a digital TV program and the decoding processing to be performed on the program received in the exemplary environment shown in FIG. 1.

Figure 2:
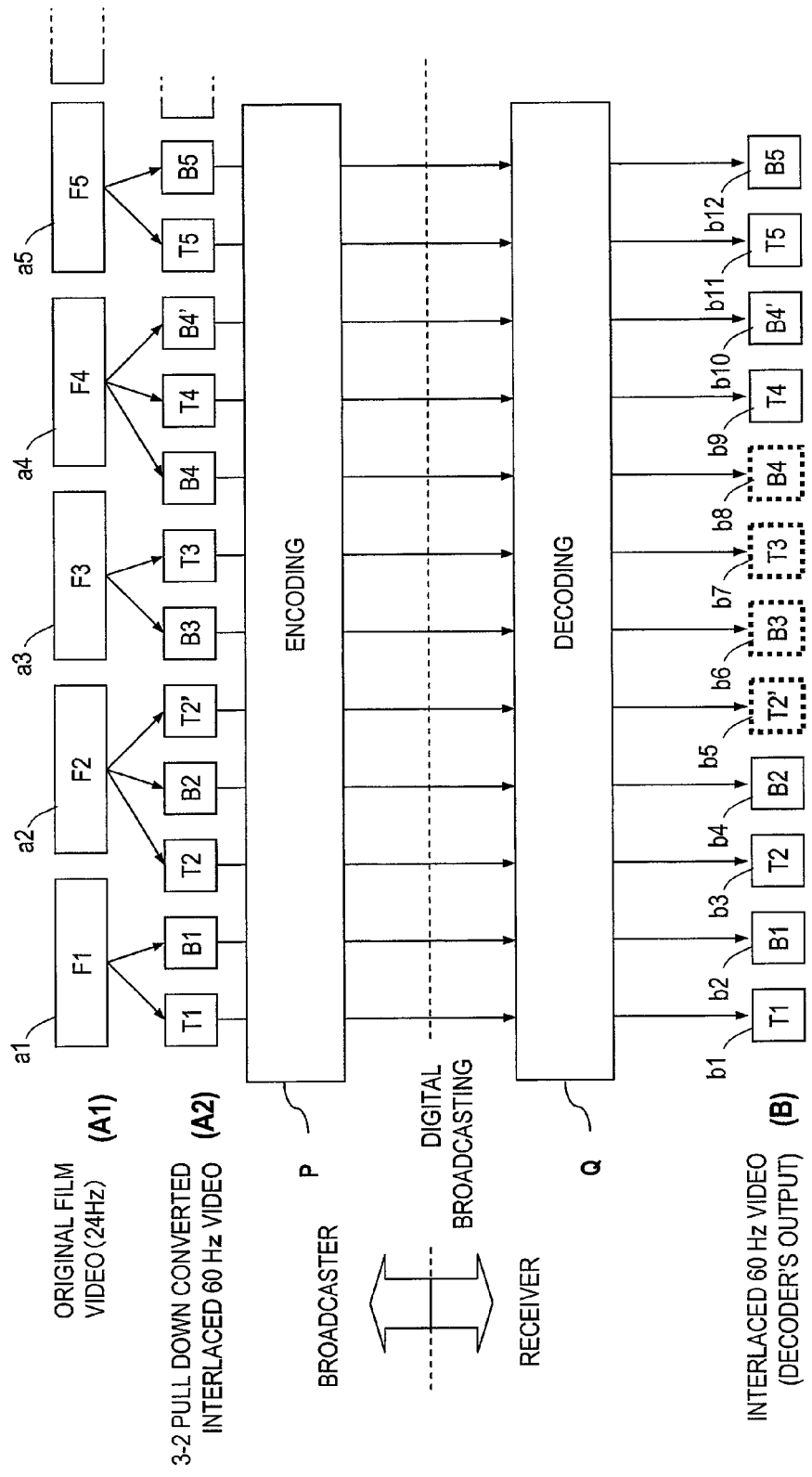
FIG. 2 outlines how the broadcaster 300 and the receiver 100 get their processing done on a digital TV program.

FIG. 2 outlines how the broadcaster 300 and the receiver 100 get their processing done on a digital TV program.

To broadcast film video (A1) at a rate of 24 frames per second (i.e., at a frequency of 24 Hz), the broadcaster 300 performs, first of all, 3-2 pull down conversion processing to obtain interlaced 60 fields per second video (A2), and then performs encoding processing P on the interlaced video (A2). The encoding processing P is carried out using a set of two fields as one coding unit. For example, the encoding processing is carried out on a set of fields T1 and B1 (where T and B denote top field and bottom field, respectively) of the interlaced video A2, which have been obtained based on the frame F1, as one coding unit, on a set of fields T2 and B2, which have been obtained based on the frame F2, as another coding unit, and on a set of fields T2' and B3, which have been obtained based on the frames F2 and F3, respectively, as still another coding unit. After that, the encoding processing will also be carried out in a similar manner on each set of two fields as one coding unit. Such an encoding method is called "encoding that uses a frame structure".

The broadcaster 300 subjects the data that has been obtained as a result of the encoding processing P to predetermined modulation processing and other kinds of processing and then broadcasts the digital TV program as an MPEG video stream, for example.

The TV set 100*a* as a receiver receives the digital TV program and performs decoding processing Q on that program. As a result, interlaced video B is obtained.

In the preferred embodiments of the present invention to be described below, the video scan converter performs the processing of outputting the video based on that interlaced video B in mutually different manners. Even though the TV program that has been transmitted by the broadcaster 300 is the same as the conventional one, the deterioration in its image quality can be reduced by the processing done by the video scan converter of each of the preferred embodiments to be described below.

It should be noted that in the drawings to be referred to in the following description, the encoding processing P and the decoding processing Q are illustrated as a simplified processing block.

(Embodiment 1)

Figure 3:
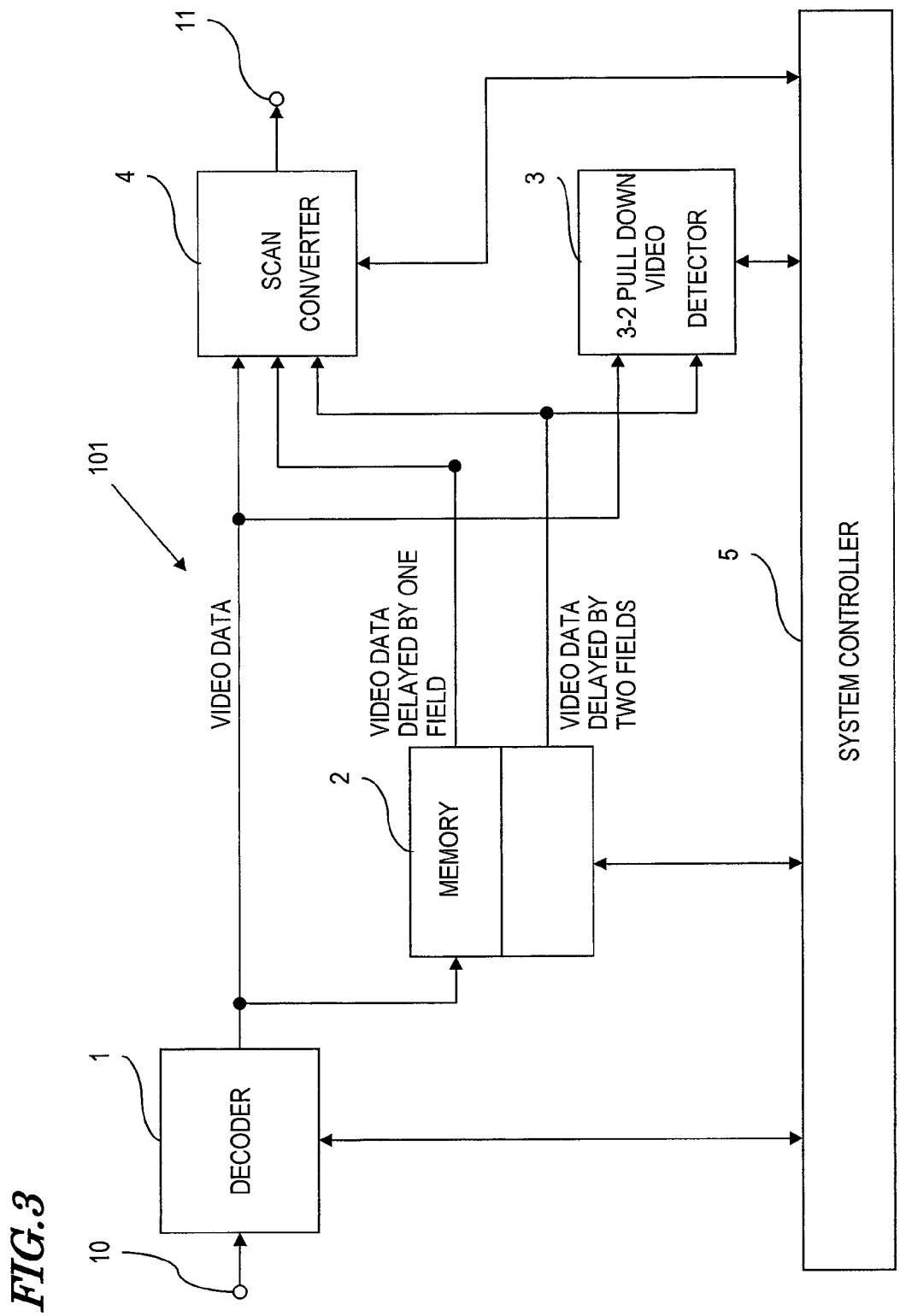
FIG. 3 is a block diagram illustrating a configuration for a video scan converter 101 as a first specific preferred embodiment of the present invention.

FIG. 3 is a block diagram illustrating a configuration for a video scan converter 101 as a first specific preferred embodiment of the present invention. The video scan converter 101 may be implemented as a single semiconductor chip.

A video stream such as an MPEG video stream is received at the input terminal 10. In response, the decoder 1 decodes the video stream received. The memory 2 stores video data for two previous fields that have been obtained by the decoder 1. The memory 2 can retain video data for one odd-numbered field and video data for one even-numbered field. The 3-2 pull down video detector 3 (which will be simply referred to herein as "detector 3") calculates the difference between the video data obtained by the decoder 1 and the video data that has been delayed for two fields by the memory 2 (which will be referred to herein as a "field difference"), thereby sensing that the video to be processed is interlaced 60 fields per second video that has been subjected to the 3-2 pull down conversion.

The scan converter 4 combines one field of the video data supplied from the decoder 1 and two previous fields of the video data stored in the memory 2, i.e., three fields in total, thereby converting field video of the same frame yet to be subjected to the 3-2 pull down conversion into progressive frame video. This conversion is done based on the information obtained by the detector 3.

The scan-converted progressive video is output through the output terminal 11. And the system controller 5 controls the entire video scan converter and may be implemented as a CPU, for example.

Figure 4:
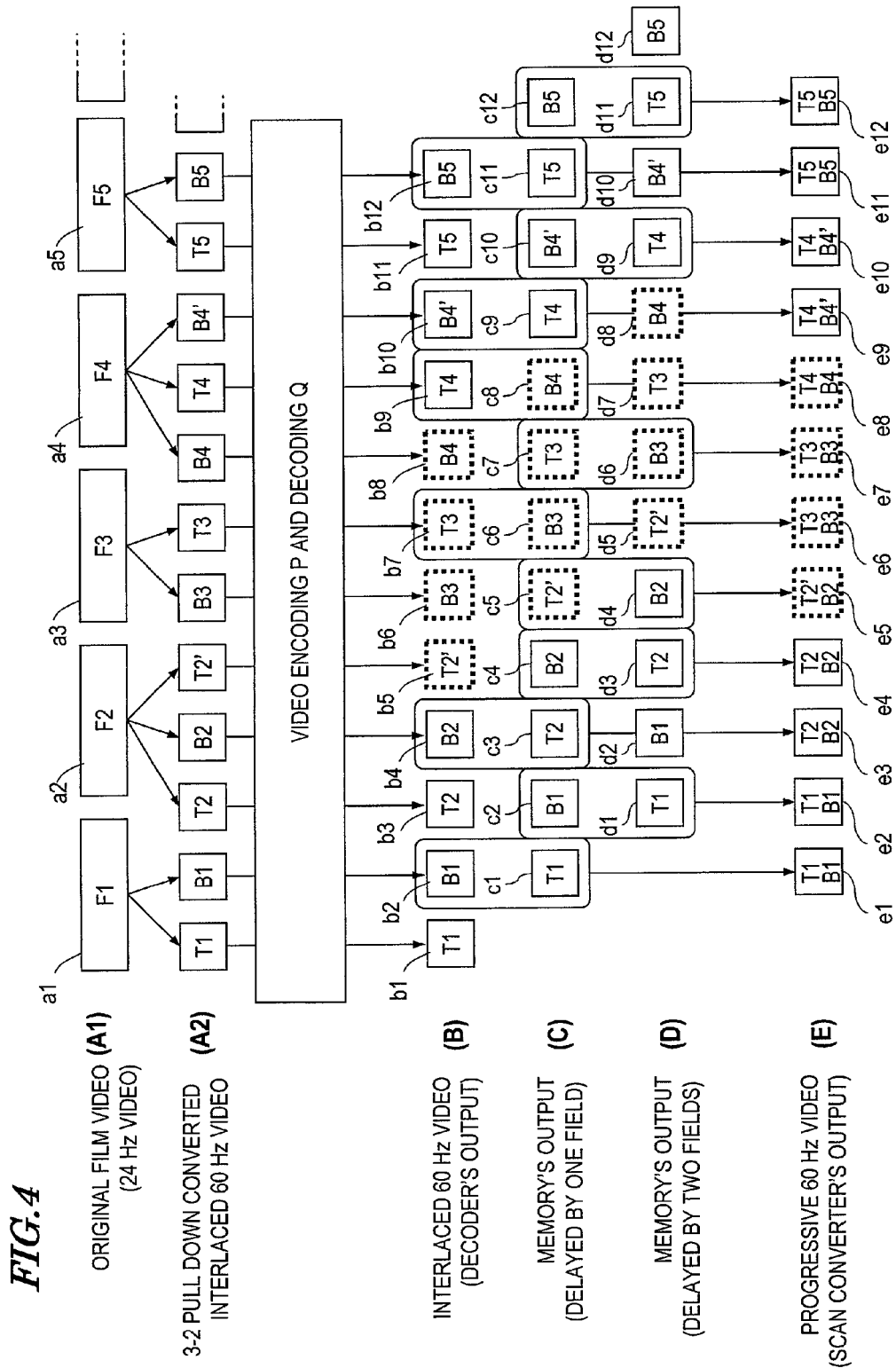
FIG. 4 shows how video is generated through the processing done by the video scan converter 101 of the first preferred embodiment.

Hereinafter, it will be described with reference to FIG. 4 how the video scan converter 101 with such a configuration carries out the processing. In FIG. 4, (A1) denotes the original 24 frames per second film video, while (A2) denotes interlaced 60 fields per second video that has been subjected to the 3-2 pull down conversion. The fields T2 and T2' are actually the same field video, so are the fields B4 and B4'.

(B) denotes the data of the interlaced 60 fields per second video obtained by getting the 3-2 pull down converted and encoded video data decoded by the decoder 1 shown in FIG. 3. (C) and (D) denote the video data stored in the memory 2 shown in FIG. 3. And (E) denotes the progressive 60 frames per second video data that has been subjected to the scan conversion by the video scan converter 101 shown in FIG. 3. In FIG. 4, the dashed fields indicate that the video yet to be subjected to the 3-2 pull down conversion was encoded in combination with another frame.

Figure 15:
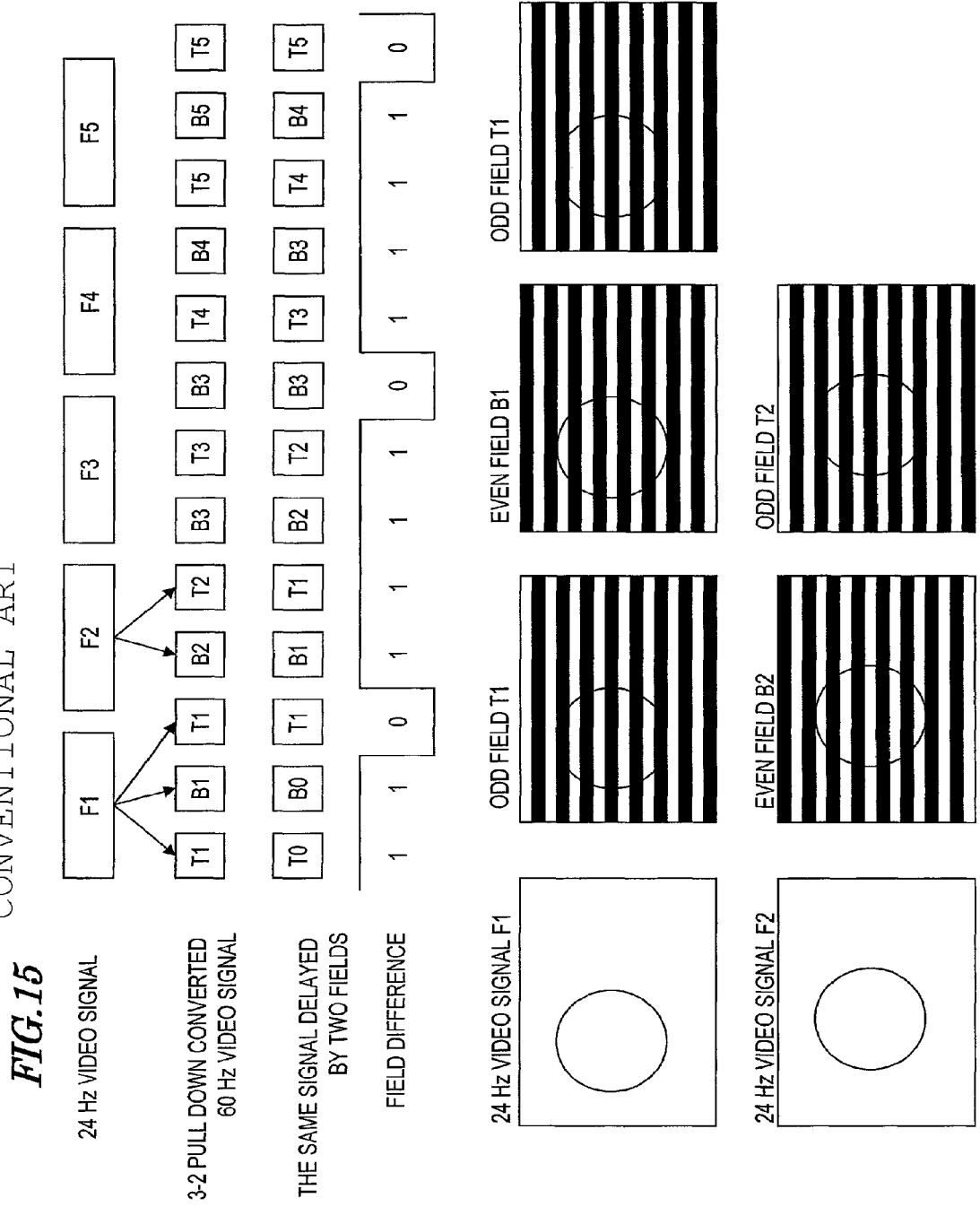
FIG. 15 illustrates how to perform processing for finding interlaced video to be 3-2 pull down converted video.

The detector 3 shown in FIG. 3 calculates the field difference between the video data supplied from the decoder 1 and the video data that has been supplied from the memory 2 with a delay of two fields. On sensing that the difference becomes equal to zero every five fields (see FIG. 15), the detector 3 determines the video data supplied from the decoder 2 to be interlaced 60 fields per second video data that has been subjected to the 3-2 pull down conversion. As a result, the detector 3 confirms the presence of the interlaced 60 fields per second video that has been subjected to the 3-2 pull down conversion. Then, the scan converter 4 combines field video of the same frame yet to be subjected to the 3-2 pull down conversion among the three fields of the video data consisting of one field of the video data (B) supplied from the decoder 1 and the two previous fields of the video data (C) and (D) stored in the memory 2, thereby generating frame video. Consequently, progressive video is output in the combination shown in portion (E) of FIG. 4.

Hereinafter, the processing to get done by the scan converter 4 will be described in further detail.

As shown in portions (A1) and (A2) of FIG. 4, all of the fields T2, B2 and T2' are video fields that have been generated based on the same frame F2. When decoded, however, the field T2' has inferior image quality to the field T2 decoded. This is because the field T2' that was combined with the field B3 coming from a different frame before encoding has lower coding efficiency than the field T2 as described above.

Let's turn to the fields B4, T4 and B4' coming from the frame F4 yet to be encoded. Likewise, the field B4 decoded has inferior image quality to the field B4' decoded. This is because the field B4 was encoded in combination with the field T3 coming from a different frame F3.

If there are three fields coming from the same frame yet to be encoded, the scan converter 4 selects one of two even- or odd-numbered fields of the three, which has the better image quality than the other, and combines the selected field with the remaining one field, thereby generating progressive video (Condition #1). On the other hand, if there are two fields coming from the same frame (i.e., an even-numbered field and an odd-numbered field), the scan converter 4 combines those two fields, thereby generating progressive video (Condition #2). In this case, the scan converter 4 determines whether Condition #1 is satisfied or not, and then determines whether Condition #2 is satisfied or not.

Hereinafter, this processing will be described in further detail with reference to FIG. 4. The scan converter 4 generates frames e1 to e3 of the progressive video shown in portion (E) based on the fields generated from the frames F1 and F2 shown in portion (A1). Each of these frames satisfies Condition #2.

Next, the scan converter 4 generates a frame e4. As shown in portions (B) through (E) of FIG. 4, the scan converter 4 generates the frame e4 based on T2 and B2 among the selectable fields T2, B2 and T2'. The field T2' is not used because the field T2 has better image quality than the field T2' (to satisfy Condition #1).

As for the next frame e5, the scan converter 4 determines that Condition #2 is satisfied. Thus, the scan converter 4 generates the frame e5 based on fields T2' (c5) and B2 (d4) coming from the same frame F2. The same can be said about the frames e6 through e8, too.

As for the frame e9, the scan converter 4 determines that Condition #1 is satisfied. Thus, the scan converter 4 generates the frame e9 based on fields T4 (c9) and B4' (b10) coming from the same frame F4.

Figure 16:
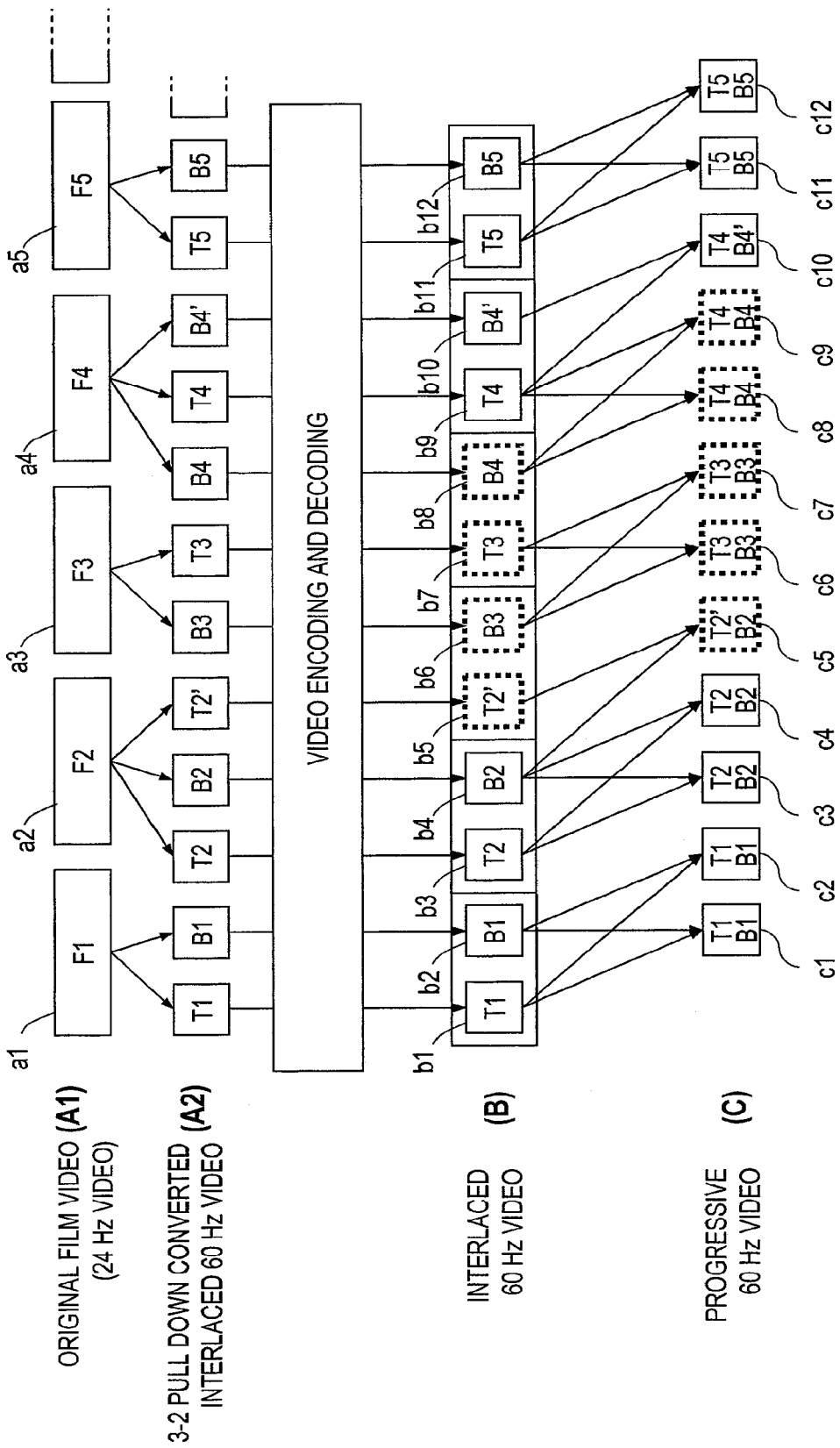
FIG. 16 illustrates how to carry out processing for scan-converting the 3-2 pull down converted video to progressive video.

One advantage over the conventional progressive video output processing is that this frame e9 has better image quality. Specifically, the frame c9 shown in portion (C) of FIG. 16 consists of a field B4 with deteriorated image quality and a field T4. On the other hand, according to the processing of this preferred embodiment, the frame e9 is generated based on fields T4 (c9) and B4' (b10) coming from the same frame F4, thus causing relatively little deterioration in image quality.

Figure 5:
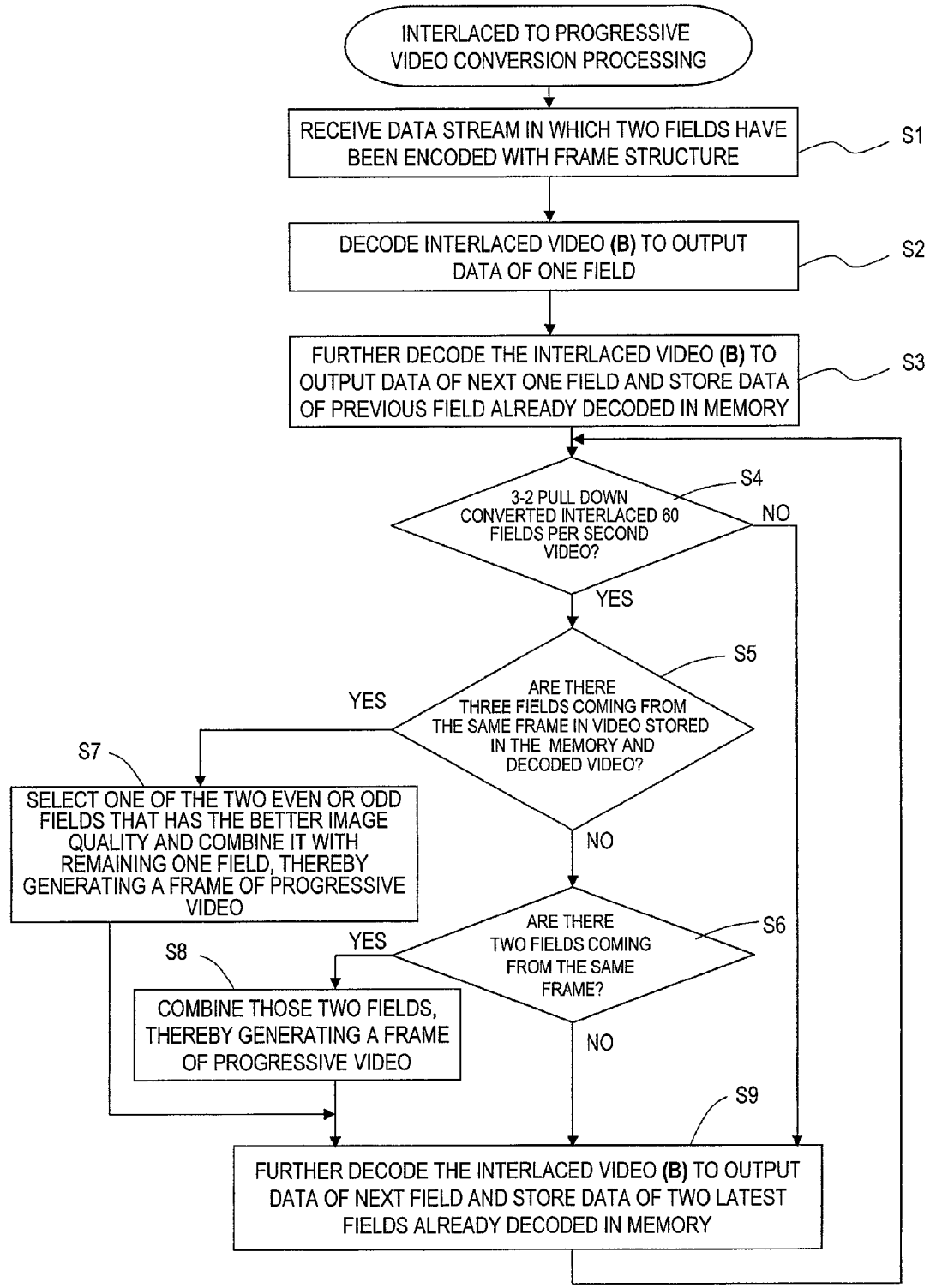
FIG. 5 is a flowchart showing the procedure of the processing to get done by the video scan converter 101.

The video scan converter 101 performs the processing described above following the procedure of the flowchart shown in FIG. 5.

FIG. 5 is a flowchart showing the procedure of the processing to get done by the video scan converter 101.

First, in Step S1, the decoder 1 receives a data stream in which two fields have been compressed with a frame structure. Next, in Step S2, the decoder 1 decodes the interlaced video (B) to output the data of one field. Then, in Step S3, the decoder 1 further decodes the interlaced video (B) to output the data of the next one field. Meanwhile, the memory 2 stores the data of the previous field that has already been decoded.

Thereafter, in Step S4, the detector 3 determines whether or not the decoded video is interlaced 60 fields per second video that has been subjected to the 3-2 pull down conversion. If the answer is YES, the process advances to Step S5. Otherwise, the process jumps to Step S9.

In Step S5, the scan converter 4 determines, based on the video stored in the memory and the decoded video, whether or not there are three fields coming from the same frame. This is a processing step to determine whether or not Condition #1 described above is satisfied. If the answer is NO, the process advances to Step S6. On the other hand, if the answer is YES, then the process advances to Step S7.

In Step S6, the scan converter 4 determines whether or not there are two fields coming from the same frame in the outputs of the memory 2 and the decoder 1. This is a processing step to determine whether or not Condition #2 described above is satisfied. If the answer is YES, the process advances to Step S8. On the other hand, if the answer is NO, then the process advances to Step S9.

In Step S7, the scan converter 4 selects one of the two even- or odd-numbered fields that has the better image quality and combines the selected field with the remaining one field of the three, thereby generating a frame of progressive video. After that, the process advances to Step S9.

In Step S8, the scan converter 4 combines those two fields with each other, thereby generating a frame of progressive video. After that, the process also advances to Step S9.

In Step S9, the decoder 1 further decodes the interlaced video (B) to output the data of the next field. Meanwhile, the memory 2 stores the data of the two latest fields already decoded. After that, the process goes back to Step S4.

The video scan converter 101 will continue this processing until the data stream has been received completely.

As described above, if odd- and even-numbered fields encoded come from mutually different video frames yet to be subjected to the 3-2 pull down conversion, then the video scan converter 101 outputs progressive video by using fields coming from the same frame as often as possible during playback. Consequently, the image quality can be improved.

(Embodiment 2)

In the first preferred embodiment described above, the memory 2 is supposed to sequentially store the decoded fields that are supplied from the decoder 1 one after another and retain the two latest ones of them.

According to this second preferred embodiment of the present invention, however, the two latest fields are not always retained in the memory. But if there are three fields coming from the same frame yet to be encoded, just one of the two even- or odd-numbered fields of the three, which has the better image quality, is supposed to be retained in the memory. As a result, a frame of the progressive video can be built on the odd- or even-numbered field that is retained in the memory with the lesser degree of image quality deterioration.

Figure 6:
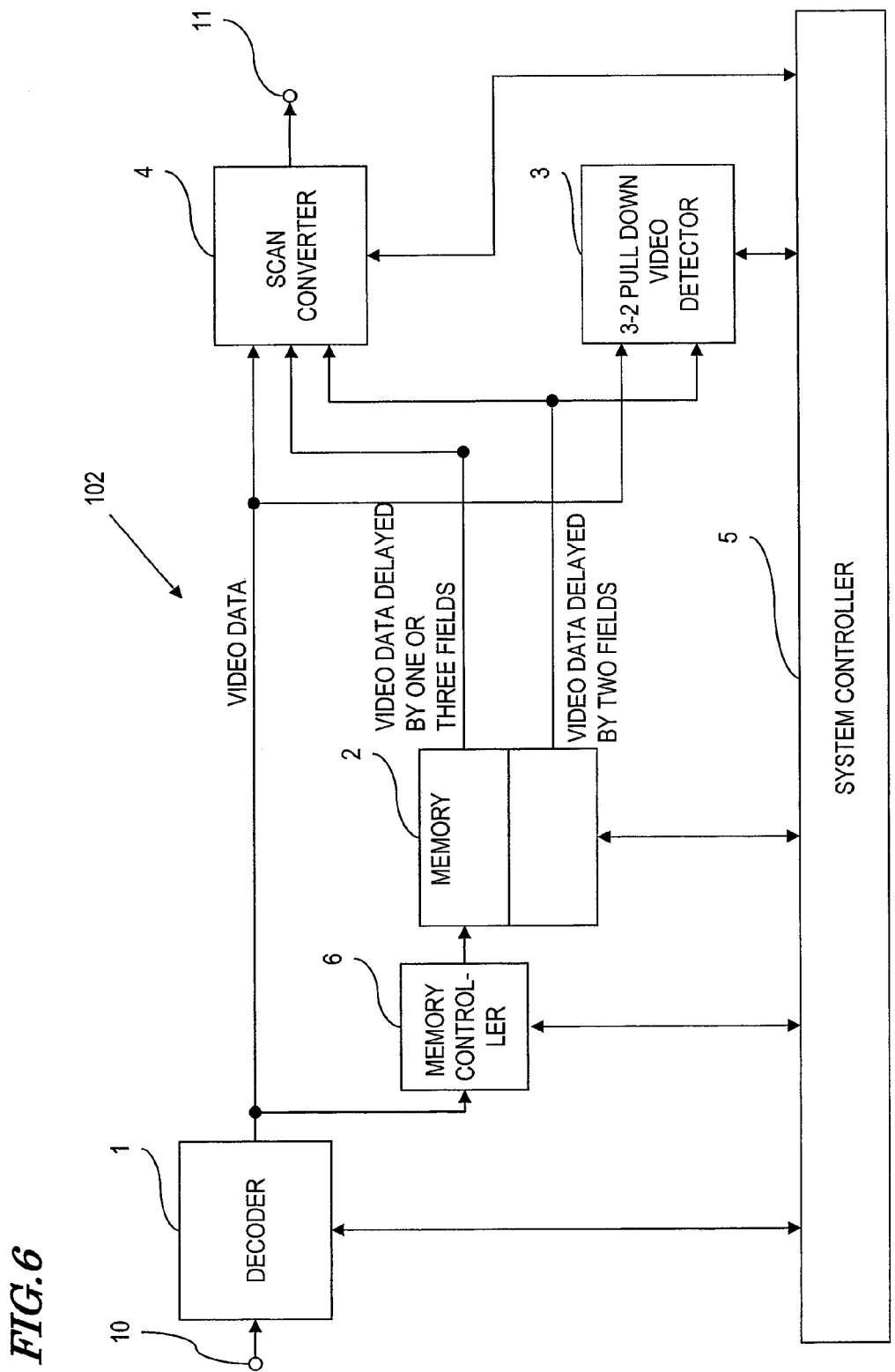
FIG. 6 is a block diagram illustrating a video scan converter 102 as a second specific preferred embodiment of the present invention.

FIG. 6 is a block diagram illustrating a configuration for a video scan converter 102 as a second preferred embodiment of the present invention. The video scan converter 102 is different from its counterpart 101 in the following respects. Specifically, the video scan converter 102 includes a memory controller 6 for controlling writing video data on the memory 2. And the earliest data of the field obtained by the decoder 1 (i.e., the data of the third latest field) can be retained in the memory 2.

Figure 7:
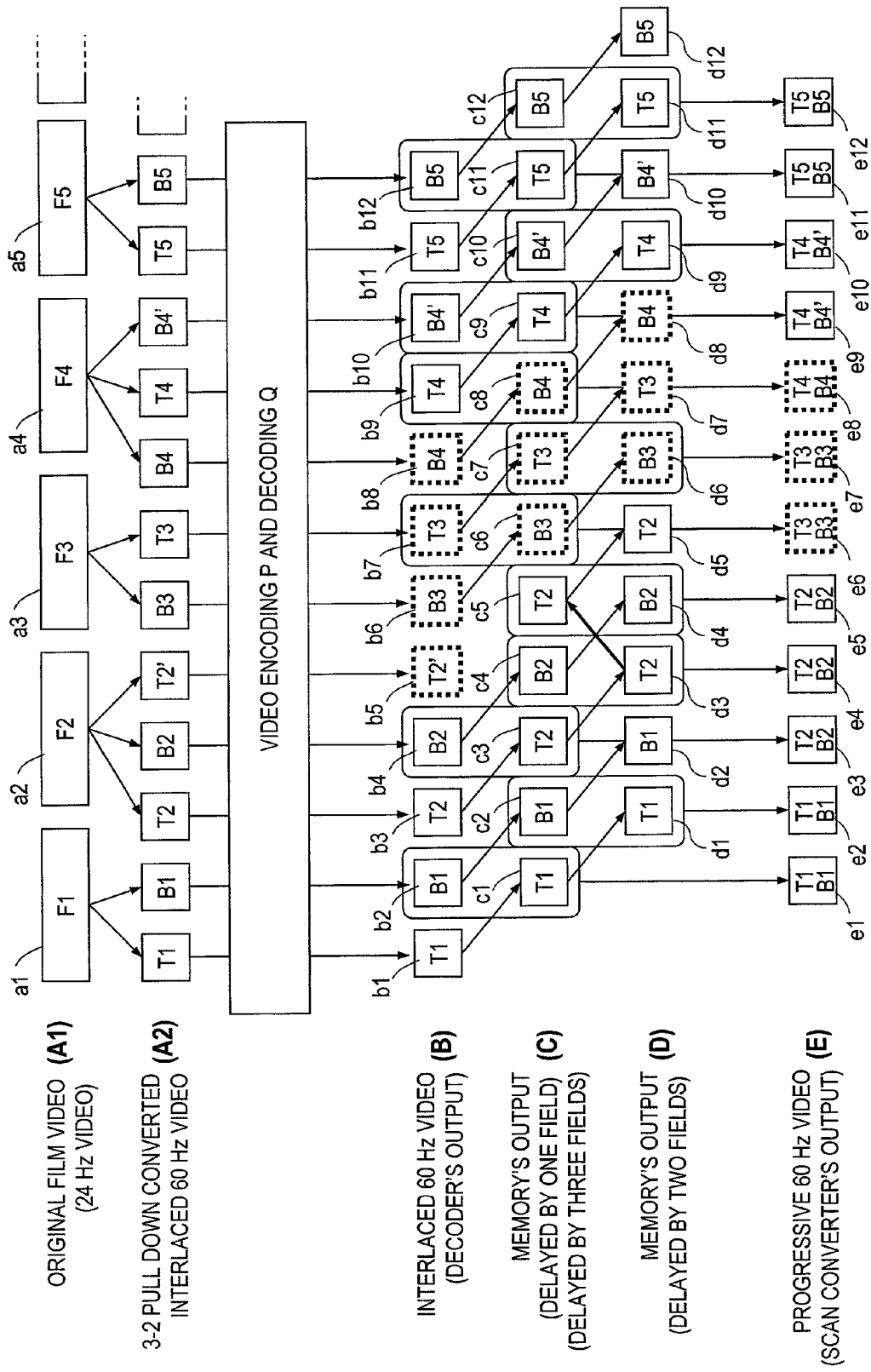
FIG. 7 shows how video is generated through the processing done by the video scan converter 102 of the second preferred embodiment.

Hereinafter, it will be described with reference to FIG. 7 how the video scan converter 102 with such a configuration carries out the processing. In FIG. 7, (A) denotes the original 24 frames per second film video, while (A2) denotes interlaced 60 fields per second video that has been subjected to the 3-2 pull down conversion. (B) denotes the data of the interlaced 60 fields per second video obtained by getting the 3-2 pull down converted and encoded video data decoded by the decoder 1 shown in FIG. 6. (C) and (D) denote the video data stored in the memory 2 shown in FIG. 6. And (E) denotes the progressive 60 frames per second video data that has been subjected to the scan conversion by the video scan converter 102 shown in FIG. 6. In FIG. 7, the dashed fields indicate that the video yet to be subjected to the 3-2 pull down conversion was encoded in combination with another frame.

According to this preferred embodiment, not just the processing of the first preferred embodiment described above but also the following processing are performed as well. That different type of processing is carried out by the decoder 1 on the second and third fields in a situation where three fields coming from the same frame yet to be subjected to the 3-2 pull down conversion have been output consecutively. As already described in detail, the field T2' has worse image quality.

When the third field b5 of the video data is output from the decoder 1, the memory controller 6 does not write it on the memory 2 but further delays the video data d3 that already has a two-field delay for one more field and then writes it onto the memory 2. The arrow pointing from the field d4 shown in portion (D) of FIG. 7 to the field c5 shown in portion (C) of FIG. 7 indicates that processing. Specifically, that processing for causing the one field delay may be done by either outputting the data of that field from the memory 2 once and then feeding it back to the memory 2 or leaving the data of that field as it is in the memory 2.

As a result of this control operation, the video data b3 of the third latest field is left as the field c5, and the frame e5 can be scan-converted based on two fields c5 (=b3) and d4 (=b4) supplied from the decoder as the same video frame.

This processing means that instead of making the scan converter 4 select a field in the processing step S7 shown in FIG. 5, the memory controller 6 selects a field and stores the selected field in the memory 2. That is why the scan converter 4 may generate a frame of the progressive video based on the two odd- and even-numbered fields that are stored in the memory 2. In the other respects, the processing may be carried out just as shown in FIG. 5.

According to the processing of this preferred embodiment, the data of the field T2 that has better image quality than the field T2' can be used, and therefore, the image quality of the frame e5 shown in portion (E) of FIG. 7 can be improved.

(Embodiment 3)

Figure 8:
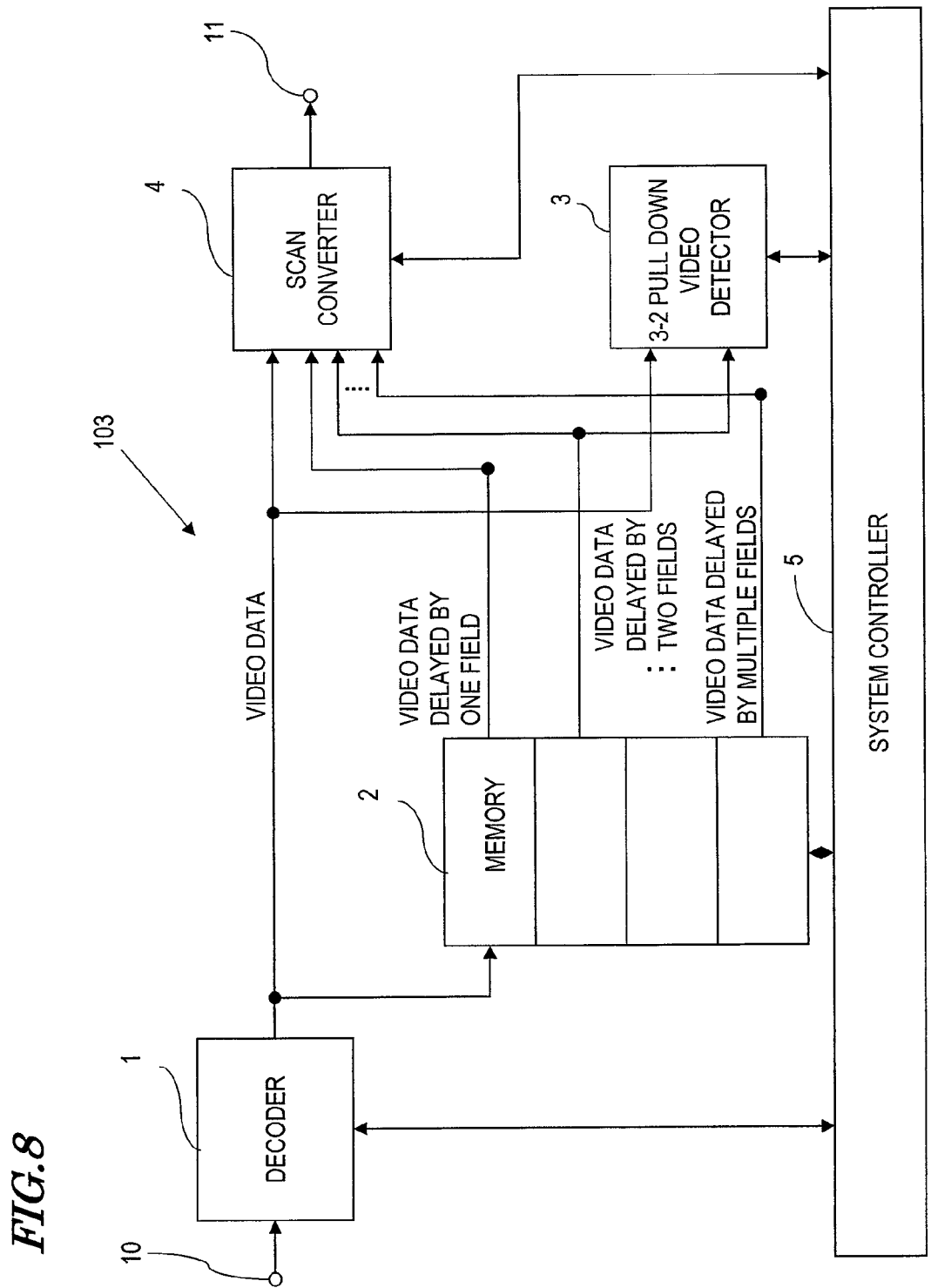
FIG. 8 is a block diagram illustrating a video scan converter 103 as a third specific preferred embodiment of the present invention.

FIG. 8 is a block diagram illustrating a video scan converter 103 as a third preferred embodiment of the present invention.

The video scan converter 103 is different from its counterpart 101 of the first preferred embodiment in that the memory 2 has storage capacity that is big enough to cause a delay of three or more fields on the video data to output and that the scan converter 4 performs the scan conversion using that video data that has been delayed for three or more fields. In the other respects, the video scan converter 103 has quite the same configuration as the converter 101 of the first preferred embodiment. Thus, the description of the respective components will be omitted herein.

Hereinafter, it will be described with reference to FIG. 9 how the video scan converter 103 shown in FIG. 8 carries out the processing.

Figure 9:
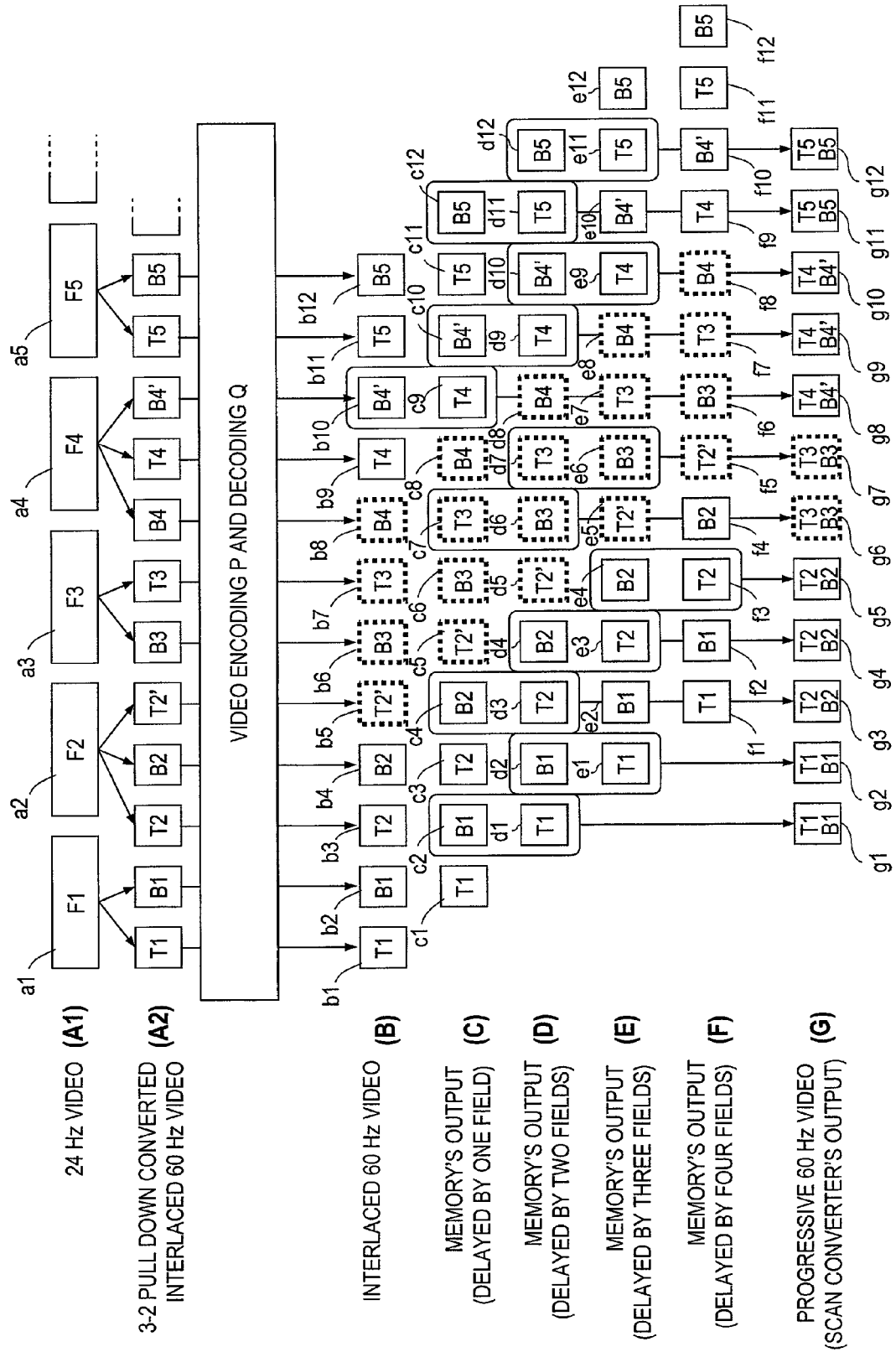
FIG. 9 shows how video is generated through the processing done by the video scan converter 103 of the third preferred embodiment.

FIG. 9 illustrates how the processing may be carried out in a situation where the memory 2 can retain the data of four fields. In FIG. 9, (A1) denotes the original 24 frames per second film video, while (A2) denotes interlaced 60 fields per second video that has been subjected to the 3-2 pull down conversion. (B) denotes the data of the interlaced 60 fields per second video obtained by getting the 3-2 pull down converted and encoded video data decoded by the decoder 1 shown in FIG. 8. (C), (D), (E) and (F) denote the video data stored in the memory 2 shown in FIG. 8. And (E) denotes the progressive 60 frames per second video data that has been subjected to the scan conversion by the video scan converter 103 shown in FIG. 8. In FIG. 9, the dashed fields indicate that the video yet to be subjected to the 3-2 pull down conversion was encoded in combination with another frame.

When the detector 3 shown in FIG. 8 senses that the video data supplied from the decoder 1 is interlaced 60 fields per second video data that has been subjected to the 3-2 pull down conversion, the following processing is carried out.

Specifically, as shown in portion (G) of FIG. 9, the scan converter 4 searches the five fields of video data, consisting of one field of the video data (B) supplied from the decoder 1 and previous four fields of the video data (C), (D), (E) and (F) stored in the memory, for fields coming from the same frame yet to be subjected to the 3-2 pull down conversion. When such fields are found, the scan converter 4 combines those fields with each other, thereby generating a frame.

According to this preferred embodiment, the deterioration in the image quality of the frames g3, g4, g5, g8, g9 and g10 can be minimized.

The processing of generating these frames may be carried out in the following manner. Specifically, there is the same field in the video data supplied from the decoder 1 and the previous four fields of the video data stored in the memory 1. For example, in generating the frame g3, there are fields T1 and B1 coming from the frame F1 shown in portion (A1) of FIG. 9 and fields T2, B2 and T2' coming from the frame F2. The third frame is generated based on a field coming from the frame F2. The scan converter 4 determines the fields coming from the frame F2 to be T2, B2 and T2', finds the fields T2 and B2 with the lesser degree of image quality deterioration, and generates a frame based on those two fields. Similar processing is carried out in generating any other frame, too.

According to the processing of this preferred embodiment, the number of progressive video frames with a reduced degree of image quality deterioration can be increased according to the number of fields that can be stored in the memory 2.

Optionally, a memory 2 that can store the data of three fields may also be used. In that case, however, the number of scan-converted video frames that can be output as a combination of two video fields coming from the same frame will decrease.

Figure 10:
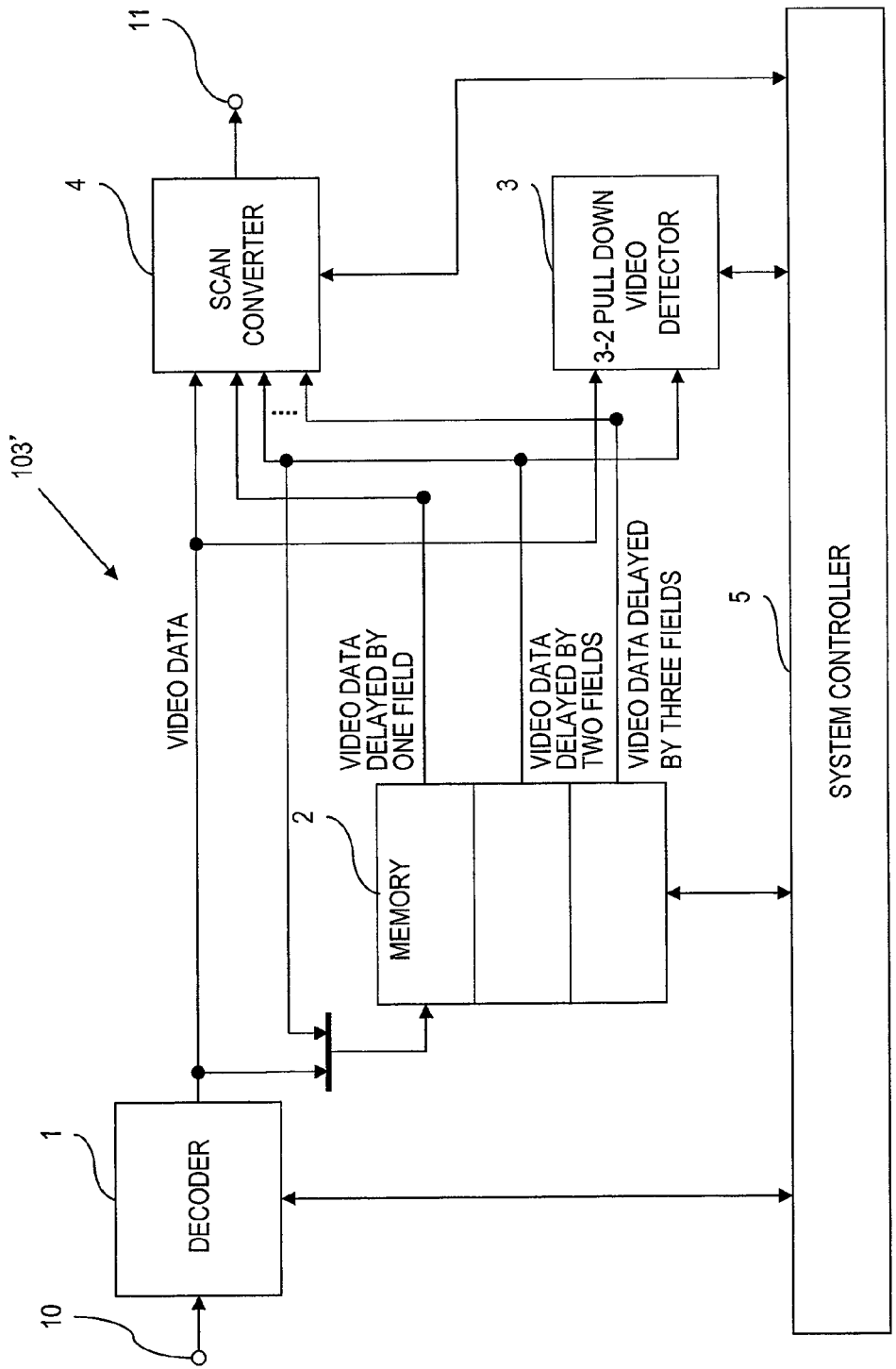
FIG. 10 is a block diagram illustrating a video scan converter 103' as a modified example of the third preferred embodiment.

Still alternatively, the video scan converter 102 may be further modified so as to have not only such a memory 2 that can store the data of three fields at a time but also the memory controller shown in FIG. 6 as well. FIG. 10 illustrates a configuration for such a video scan converter 103'. And FIG. 11 illustrates how to generate video through the processing done by the video scan converter 103'.

The processing to get done by this video scan converter 103' is characterized in that if there are three fields coming from the same frame yet to be encoded, the data of one of the two even- or odd-numbered fields that has the better image quality is left in the memory 2.

Figure 11:
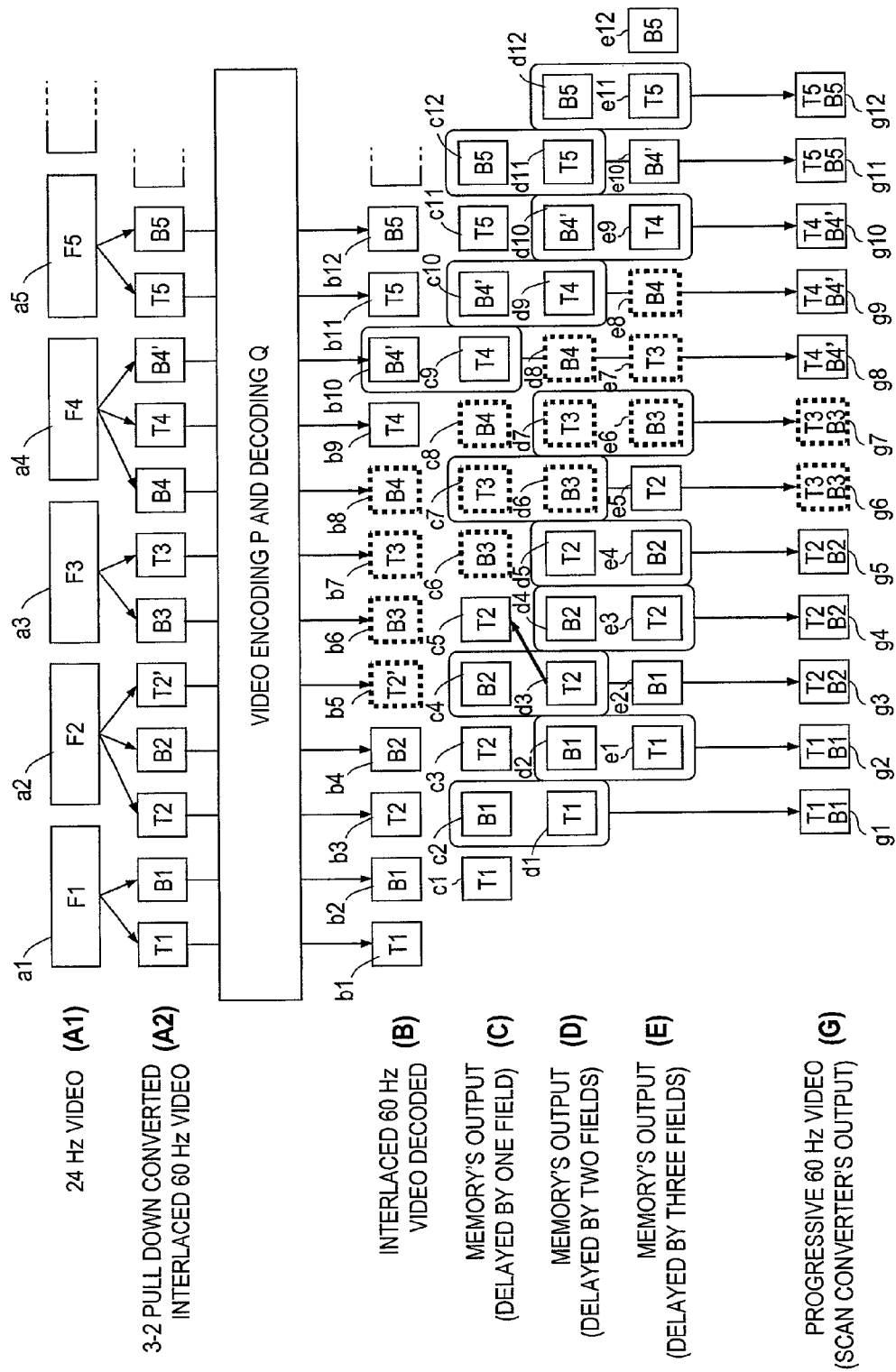
FIG. 11 shows how video is generated through the processing done by the video scan converter 103'.

For example, as shown in portion (B) of FIG. 11, if a field T2' (b5) with a worse image quality is generated, then the memory controller finds the field T2 with the better image quality (i.e., the field T2 (d3) shown in portion (D)) coming from the same frame F2 yet to be encoded. Then, the memory controller does not write the data of the field T2' onto the memory 2 but further delays the data of the field d3 that already has a delay of two fields for one more field and then writes it onto the memory 2. The arrow pointing from the field d3 shown in portion (D) of FIG. 11 to the field c5 shown in portion (C) of FIG. 7 indicates that processing.

According to this processing, a frame can be built without using the field T2' with worse image quality.

(Embodiment 4)

Figure 12:
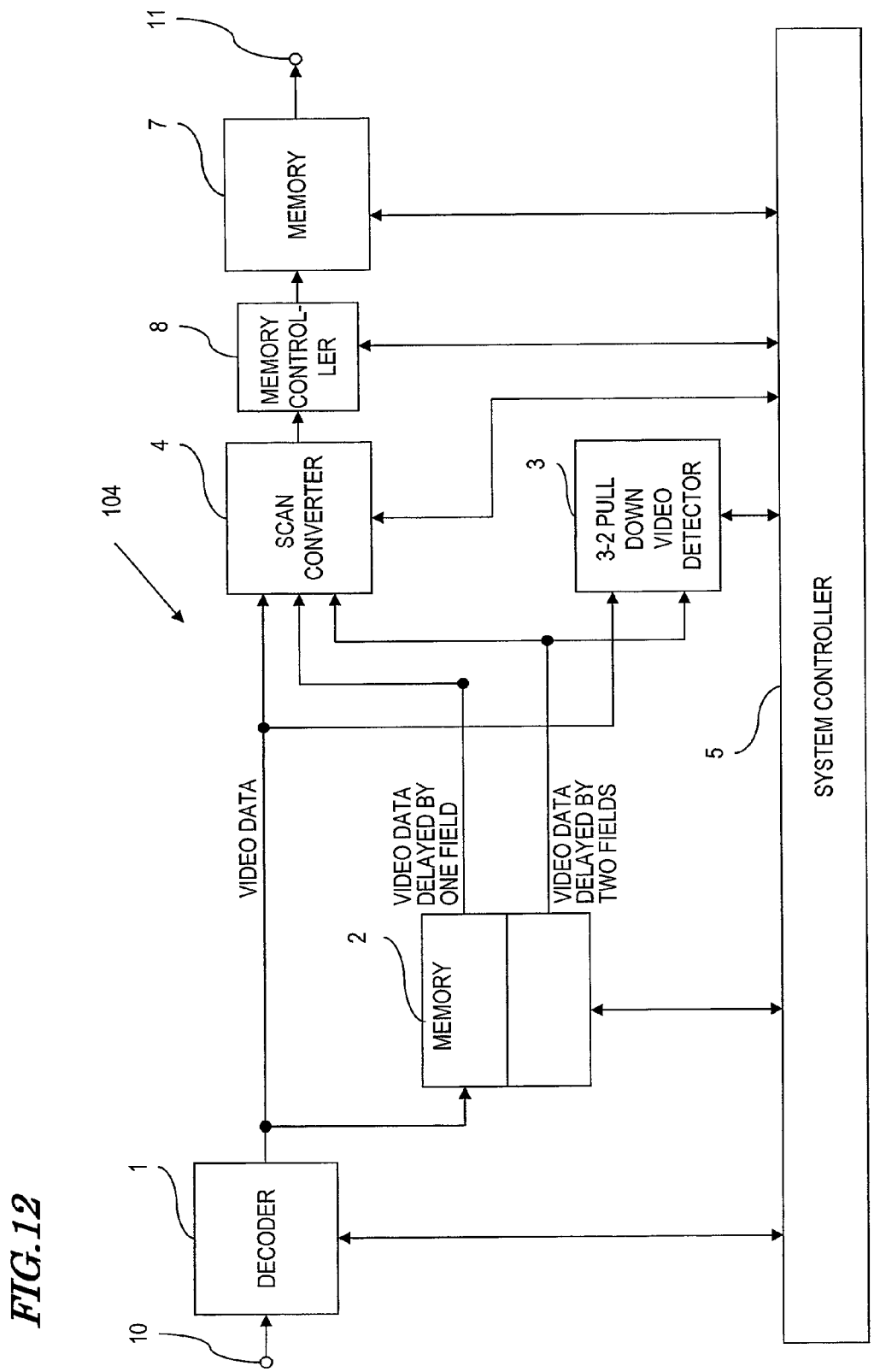
FIG. 12 is a block diagram illustrating a video scan converter 104 as a fourth specific preferred embodiment of the present invention.

FIG. 12 is a block diagram illustrating a video scan converter 104 as a fourth preferred embodiment of the present invention.

The difference between the video scan converter 104 and its counterpart 101 of the first preferred embodiment described above lies in that a memory 7 and a memory controller 8 are added after the scan converter 4 in this preferred embodiment. By providing these additional components, frames with even lesser degrees of image quality deterioration can be output than in the first preferred embodiment.

The memory 7 retains the frame data supplied from the scan converter 4. The memory controller 8 controls writing the frame data on the memory 7. The frame data of the progressive video that has been subjected to the scan conversion is passed through the memory 7 and then output through the output terminal 11. In the other respects, the video scan converter 104 of this preferred embodiment has the same configuration as its counterpart 101 of the first preferred embodiment described above, and the description thereof will be omitted herein.

Figure 13:
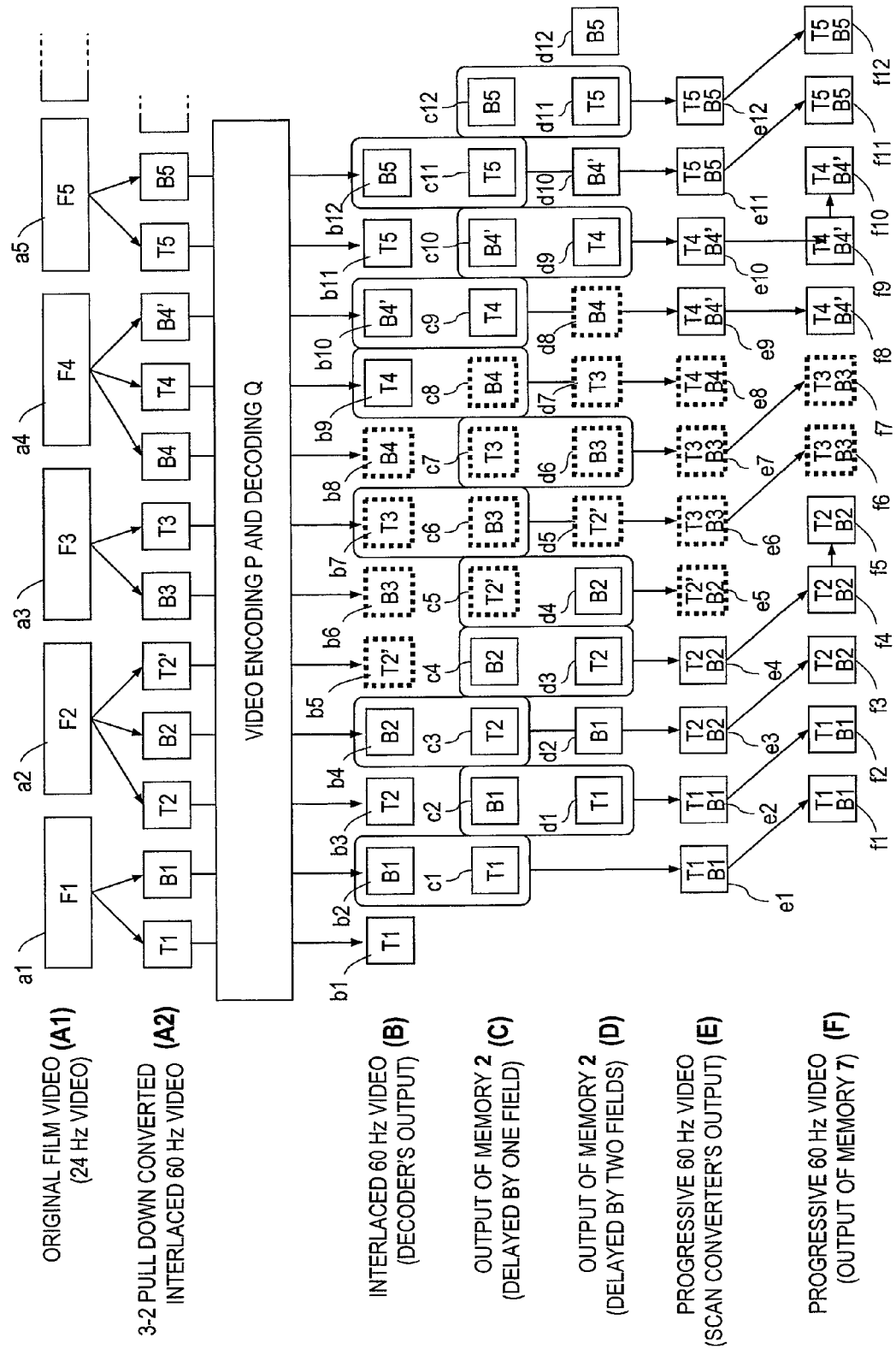
FIG. 13 shows how video is generated through the processing done by the video scan converter 104 of the fourth preferred embodiment.

Hereinafter, it will be described with reference to FIG. 13 how the video scan converter 104 with such a configuration carries out the processing. In FIG. 13, (A1) denotes the original 24 frames per second film video, while (A2) denotes interlaced 60 fields per second video that has been subjected to the 3-2 pull down conversion. (B) denotes the data of the interlaced 60 fields per second video obtained by getting the 3-2 pull down converted and encoded video data decoded by the decoder 1 shown in FIG. 12. (C) and (D) denote the video data retained in the memory 2 shown in FIG. 12. (E) denotes the progressive 60 frames per second video data that has been subjected to the scan conversion by the video scan converter 4 shown in FIG. 12. And (F) denotes the progressive video data to be output from the memory 7 shown in FIG. 12. In FIG. 13, the dashed fields indicate that the video yet to be subjected to the 3-2 pull down conversion was encoded in combination with another frame.

When the detector 3 shown in FIG. 12 senses that the video data supplied from the decoder 1 is interlaced 60 fields per second video data that has been subjected to the 3-2 pull down conversion, the video scan converter 104 generates the frames shown in portion (E) of FIG. 13 by performing the same processing as its counterpart 101 of the first preferred embodiment described above.

Also, the memory controller 8 controls the writing such that if the scan converter 4 outputs three times in a row frames that have come from the same video frame yet to be subjected to the 3-2 pull down conversion, at least one video frame that has not been scan-converted from two video fields that were the same video frame when output from the decoder 1 is not written onto the memory 7.

Such a control operation will be described more specifically.

The memory controller 8 usually writes the data of generated frames (such as frames e1 through e4) as they are onto the memory 7. Those data will be output as frames f1 through f4, respectively.

However, the memory controller 8 does not write the data of frames including fields with relatively poor image quality (such as the frames e5 and e8). Instead, when such a frame should be output, the frame e4 is output as the frame f5 in place of the frame e5, for example.

As for the frames e6 and e7, there are no replacement frames with good image quality. That is why the memory controller 8 writes the data of those frames e6 and e7 as they are onto the memory 2. Meanwhile, the data of the frame e8 is not written onto the memory 2, either. This is because the frame e9 to be output after the frame e8 has a lesser degree of image quality deterioration, and therefore, the data of the frame e9 should rather be written than that of the frame e8. As a result, the frame e8 is not output but the frame e9 is output instead when the frame e8 should be output. After that, the frames will be output just as shown in portion (F) of FIG. 13. By performing such a control operation, the scan conversion can be done without using the frames e5 and e8 that were not the same video frame when output from the decoder 1.

Figure 14:
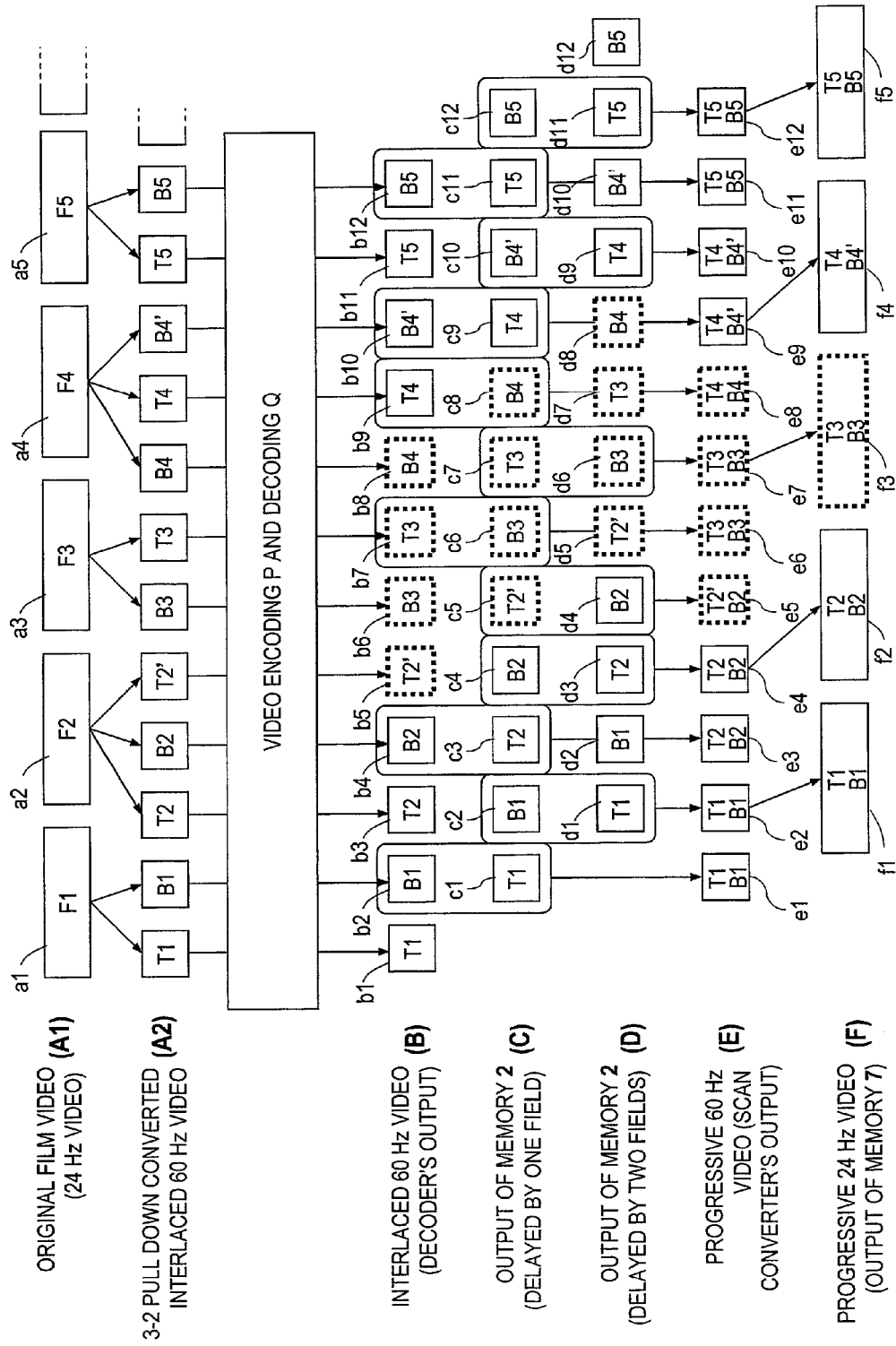
FIG. 14 illustrates how video can be output at a rate of 24 frames per second as a result of the processing done by the video scan converter 104 of the fourth preferred embodiment.

In the preferred embodiment described above, the output of the memory 7 is supposed to be supplied at a rate of 60 frames per second. However, the output of the memory 7 could also be supplied at a rate of 24 frames per second (i.e., at 24 Hz) as shown in FIG. 14. In that case, the memory controller 8 shown in FIG. 12 performs a control operation such that as for the output of the scan converter 4, a video frame that has been scan-converted from two video fields that were the same video frame when output from the decoder 1 is written onto the memory 7 preferentially.

Also, in the preferred embodiment described above, the output of the scan converter 4 is supposed to be always passed through the memory 7. However, writing on the memory 7 may be performed continuously and either the output of the scan converter 4 or that of the memory 7 may be passed selectively.

As described above, according to this preferred embodiment of the present invention, in a period in which the decoder outputs, in a row, three video fields that were the same video frame before subjected to the 3-2 pull down conversion, a video frame that has been scan-converted from a combination of two video fields that were the same video frame when output from the decoder 1 is output preferentially among those three video fields, thereby realizing a video scan converter that can minimize the image quality deterioration involved with encoding.

In the foregoing description of preferred embodiments, the processing of receiving and decoding a digital TV program has been described. However, this is just an example. Alternatively, the processing described above is also applicable to a situation where a digital TV program recorded needs to be played back.

Optionally, if the data of a digital TV program recorded has been edited (e.g., if the commercial message portions thereof have been deleted), then the system controller 5 may control the video scan converter so as not to perform the processing of using fields with no image quality deterioration instead of fields with image quality deterioration. This is because once such editing has been made, the regularity to get the field difference detection processing (see FIG. 15) done can no longer be maintained and the image quality could not be improved. If such regularity to get the field difference detection processing done (see FIG. 15) has been lost, the system controller 5 may instruct the respective components to stop performing the processing of the present invention once the editing has been made. In accordance with that instruction, the memory 2 may perform the processing of clearing the buffers, for example, to get the initialization done.

Also, in the foregoing description of preferred embodiments, the detector 3 is supposed to sense, by the regularity to get the field difference detection processing done (see FIG. 15), that the 24 frames per second film video has been subjected to the 3-2 pull down conversion and then transmitted. However, this processing is not an essential one. For example, a digital broadcast stream (such as an MPEG-2 transport stream) has various kinds of control information. And it can be determined, by an identifier called "repeat first field (REF)" which is one of those kinds of control information, whether or not the data stream has been obtained by the 3-2 pull down conversion. For that reason, the system controller 5 of the video scan converter may perform the processing of detecting that identifier instead of the regularity to get the field difference detection processing done.

Furthermore, in the foregoing description of preferred embodiments, the video scan converter is supposed to be a semiconductor chip. However, this is just an example. Alternatively, the video scan converter shown in FIG. 3 or any other drawing may include two or more chips. Or the respective components of the video scan converter may be implemented as separate chips or memory modules.

The video scan converter of the preferred embodiments of the present invention described above operates in accordance with a computer program. For example, the video scan converter 101 of the first preferred embodiment described above operates in accordance with a computer program that defines the procedure shown in FIG. C. Such a computer program could be either stored on an optical disc or a flash memory card or transmitted over a network.

It should be noted that the various preferred embodiments of the present invention described above could be applicable for use in not just digital TV programs but also the fields of optical disc players for reading a video signal from an optical disc such as a DVD or a Blu-ray Disc and network players for decoding a video signal on the Web.

The video scan converter of the present invention is designed to perform scan conversion on 3-2 pull down converted video data and can be used effectively in video display monitors and players.

What is claimed is:

1. A video scan converter for decoding an encoded video stream and then outputting the decoded stream with its scan method converted,
    wherein the video scan converter comprises:
        a decoder receives a video stream including a first coding unit, which has been obtained by compressing a pair of fields N1 and N2 that has come from a first frame of film video, and a second coding unit, which has been obtained by compressing a pair of a field N3 that has also come from the first frame and a field M1 that has come from a second frame, not the first frame, decodes the first and second coding units, and sequentially outputs the data of the respective fields N1, N2, N3 and M1; and
        a scan converter, which receives the data of the respective fields from the decoder and which generates and outputs a frame based on the data of associated two of those fields that have been supplied from the decoder, and
    wherein in outputting a frame associated with the data of the field N3, the scan converter generates the frame based on the data of the fields N1 and N2 which are obtained by decoding a coding unit which has been obtained by compressing a pair of two fields coming from a same frame without using the data of the field N3 which is obtained by decoding a coding unit which has been obtained by compressing a pair of two fields coming from different frames from each other.

2. The video scan converter of claim 1, wherein in outputting a frame associated with the data of the field N1 or N2, the scan converter generates the frame based on the data of the fields N1 and N2.

3. The video scan converter of claim 1, wherein the fields N1 and N3 are top fields, and
    wherein the fields N2 and M1 are bottom fields.

4. The video scan converter of claim 1, further comprising a memory that is able to store the data of two of the fields supplied from the decoder in order for the scan converter to generate the frame,
    wherein upon the first coding unit and then the second coding unit being input to the decoder,
    the decoder does not store the data of the field N3 in the memory when outputting the data of the field N3 in the event the decoder has already stored the fields N1 and N2 in the memory.

5. The video scan converter of claim 1, further comprising a detector for sensing, based on multiple fields that have been supplied from the decoder, that the video stream has been obtained by subjecting progressive video, including the first and second frames, to 3-2 pull down conversion,
    wherein when the detector senses that the video stream has been obtained by subjecting the progressive video, including the first and second frames, to the 3-2 pull down conversion, the scan converter generates the frame.

6. The video scan converter of claim 1, wherein the image quality of the field N1 is superior to that of the field N3.

7. The video scan converter of claim 4, wherein the memory retains the data of the field N1 for more than two field periods.

8. The video scan converter of claim 1, further comprising:
    a first memory that is able to store the data of at least two of the fields supplied from the decoder; and a second memory that is able to store the data of the frame generated by the scan converter, wherein when the scan converter outputs a frame associated with the data of the field N2, the first memory retains the data of the fields N1 and N2 and the scan converter generates a frame based on the data of the field N1 retained in the memory and the data of the field N2 supplied from the decoder and then writes the data of the frame thus generated into the second memory, and wherein when outputting a frame associated with the data of the field N3, the scan converter does not generate any frame based on the data of the fields but outputs the data of the frame stored in the second memory.

9. The video scan converter of claim 1, wherein the video stream is interlaced 60 fields per second video that has been obtained by subjecting 24 frames per second film video to 3-2 pull down conversion, and wherein the scan converter outputs a frame of progressive 60 frames per second video.

10. The video scan converter of claim 1, wherein the video stream has an identifier indicating that the video stream has been obtained by subjecting progressive video, including the first and second frames, to 3-2 pull down conversion, and wherein the video scan converter further includes a detector for sensing, by reference to the identifier, that the video stream has been obtained by subjecting the progressive video, including the first and second frames, to the 3-2 pull down conversion, and wherein when the detector senses that the video stream has been obtained by subjecting the progressive video, including the first and second frames, to the 3-2 pull down conversion, the scan converter generates the frame.

* * * * *